Oct. 11, 1938.  H. G. WATSON ET AL  2,132,910

TOTALIZATOR

Filed Aug. 2, 1935    3 Sheets-Sheet 1

H. G. Watson
H. C. Mitchell
INVENTORS

Glascock Downing & Seebohm
ATT'YS

Oct. 11, 1938.  H. G. WATSON ET AL  2,132,910
TOTALIZATOR
Filed Aug. 2, 1935  3 Sheets-Sheet 2
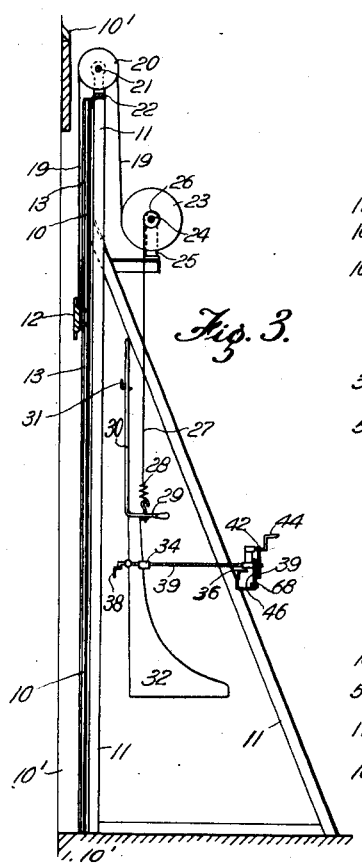
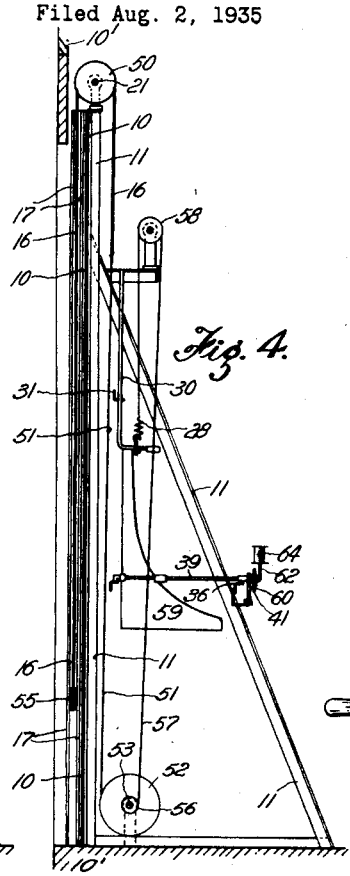
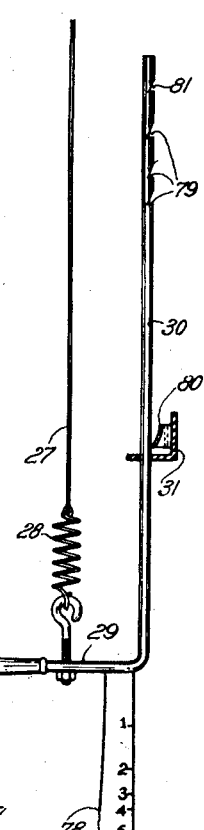
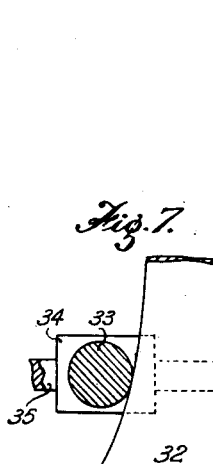
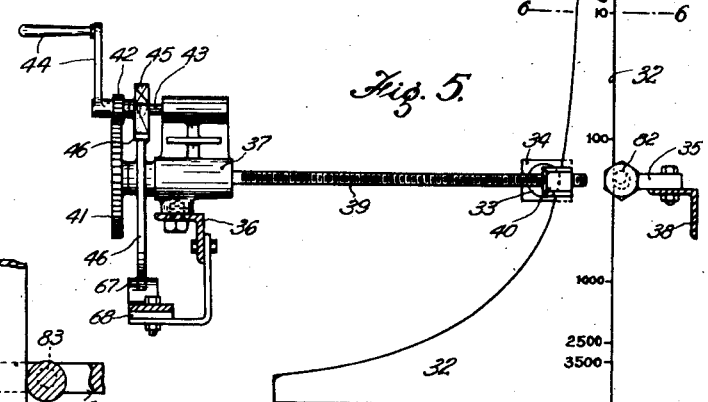
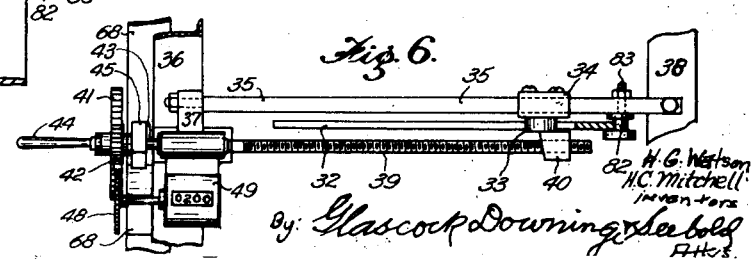

Oct. 11, 1938.     H. G. WATSON ET AL     2,132,910
TOTALIZATOR
Filed Aug. 2, 1935     3 Sheets-Sheet 3
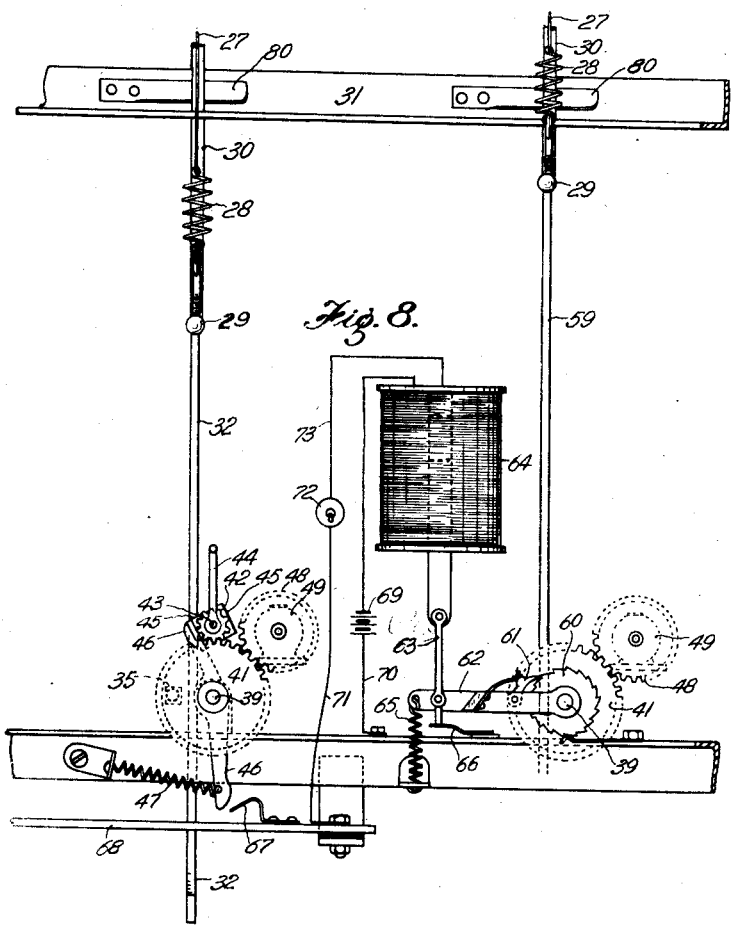
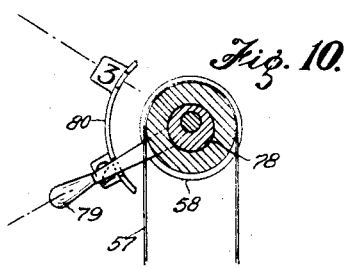
Inventors,
H. G. Watson
H. C. Mitchell
By: Glascock Downing & Seebold
Attys.

Patented Oct. 11, 1938

2,132,910

UNITED STATES PATENT OFFICE

2,132,910

TOTALIZATOR

Henry George Watson, Camberwell, Victoria, and Henry Crockett Mitchell, Ascot Vale, Victoria, Australia, assignors to Duplex Totalisators Proprietary Limited, Melbourne, Victoria, Australia Application August 2, 1935, Serial No. 34,444
In Australia August 13, 1934

16 Claims. (Cl. 235—61)

This invention relates to improvements in and connected with totalizators and refers especially to apparatus of the type adapted to visually indicate the odds relating to each of a number of contestants in a horse or other race or in connection with any analogous event on which investments may be made.

Totalizators fulfilling the above mentioned requirements are already well known and the object of the present invention is to provide novel apparatus for this purpose, said apparatus being simple and effective in construction and operation, readily adjustable and adaptable for use either in a permanent position or as a portable machine.

With these and other objects in view, the invention resides in a totalizator having a plurality of cams corresponding in number to the contestants, a movable indicating member associated with each of said cams, control means individual to said cams and operable either manually or mechanically in accordance with the number of investments made on the respective contestants whereby the corresponding indicating members are caused to move through distances proportional to the logarithms of said numbers of investments, at least one additional indicating member arranged adjacent to said first-mentioned indicating members, means for causing the additional indicating member to move through a distance proportional to the logarithm of the total number of investments made on all the contestants and an odds scale so arranged on the additional indicating member that the odds in respect of each contestant are designated by the relative positions of the co-operating indicating members.

More particularly a totalizator in accordance with the invention preferably comprises a plurality of logarithmic cams which are movable rectilinearly in accordance with the number of investments made on the respective contestants, indicating members adapted to move vertically downwards in proportion to the movement of the respective cams, at least one additional logarithmic cam movable rectilinearly in accordance with the logarithm of the total number of investments on all the contestants, and at least one odds scale adapted to move vertically downwards in proportion to the movement of the last-mentioned cam and in juxtaposition to the first-mentioned indicating members whereby the positions of said indicating members relatively to the odds scale designate the odds relating to the respective candidates.

The movements of the indicating members corresponding to the various contestants are preferably controlled, either directly or through multiplying mechanism, by flexible connections passing from the respective rectilinearly movable logarithmic cams and the odds scale or scales which may consist of flexible metal strips having the requisite graduations applied to the front faces thereof are preferably controlled, either directly or through intermediate multiplying mechanism, by flexible connections passing from the corresponding logarithmic cam.

A salient feature of the invention resides in utilizing the weights of the various indicating members and scales to impart the requisite movement to the corresponding cams, these movements, however, being controlled by individual cam followers movable in direct proportion to the number of investments made on the respective contestant or to the total number of investments made, as the case may be.

From the foregoing it will be understood that the vertical distance between any one of the indicating members and the lower end of the odds scale is proportional to the logarithm of the ratio between the total number of unit investments and the number of investments made on the contestant corresponding to said indicating member.

Therefore, as a definite rate of odds is payable for each such ratio, the odds corresponding to a selected number of such ratios are marked on the said scale.

The odds so indicated may be the so-called totalizator odds which include the stake, or alternatively they may be bookmakers' odds which exclude the stake and which therefore are 1 less than totalizator odds.

Thus, if A designates the total number of unit investments on the totalizator and B designates the number of unit investments made on a particular contestant, bookmakers' odds are equal to $$\frac{CA}{100B} - 1$$

where C denotes the percentage of the total investments which is divided between the successful investors.

The invention is equally applicable to totalizators in which contestants are backed for a win or a place and, in the latter case, includes simple and effective adjustment means whereby the proper odds will be shown according to whether dividends are payable on the first two, three or more candidates.

Further features of the invention reside in the particular construction and arrangement of the parts which hereinafter are more fully described.

In the accompanying drawings which show preferred embodiments of the invention:

Figure 3 is a view in sectional end elevation taken on the line 3—3 of Figure 1 and is drawn to a larger scale.

Figure 4 is a sectional view similar to Figure 3 and is taken on the line 4—4 of Figure 1.

Figure 5 is a view in end elevation of a cam and associated mechanism corresponding to one of the contestants and is drawn to a larger scale than the preceding figures.

Figure 6 is a view in sectional plan taken on the line 6—6 of Figure 5.

Figure 7 is a fragmentary view of portion of a cam and associated parts.

Figure 8 is a view in end elevation showing the mechanism included in Figure 5.

Figure 10 is a view showing a modification which hereinafter is fully described.

For convenience the following description is directed to a totalizator adapted to be employed in connection with horse racing though it will be understood from the foregoing that the invention is not confined thereto.

Figure 1:
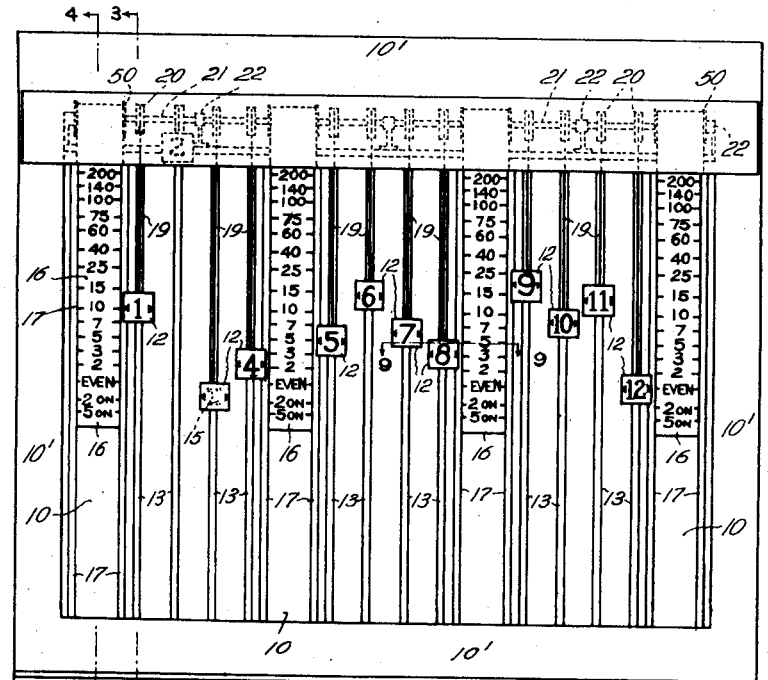
Figure 1 is a view in front elevation of a totalizator constucted and arranged in accordance with the invention.

Referring now to the drawings and particularly to Figure 1 thereof, the reference numeral 10 designates a vertical metal sheet secured to a frame 11 (Figures 2, 3 and 4) and forming the face of the apparatus which is housed in a suitable building 10'. This building is open at the front whereby the said metal sheet 10 is visible from the outside thereof.

A plurality of indicator plates 12, one for each horse, are slidably mounted in front of the face plate 10 and are adapted to move vertically downwards in proportion to the logarithms of the numbers of investments made on the respective horses which are identified as shown by numbers applied to the front faces of the indicator plates.

Each indicator plate 12 is mounted on a corresponding vertically disposed guide strip 13 which is secured to the face plate 10 and spaced therefrom by distance pieces 14. For this purpose two spaced pairs of screws 15 having circular heads provided with circumferential grooves are secured to the back of each indicator plate 12 and the longitudinal edges of the corresponding guide strip 13 are slidably received in the grooves as shown in Figure 9, and on the indicator plate for No. 3 horse in Figure 1.

A plurality of odds scales 16 formed of relatively wide flexible metal strips are also mounted for vertical movement in advance of the face plate 10 and in the arrangement shown in the drawings four such scales are provided in spaced relationship, thus forming three intermediate spaces in each of which four indicator plates 12 are mounted. It will be understood, however, that any desired number of scales 16 may be employed and that any convenient number of indicator plates 12 may be arranged between each adjacent pair of scales.

These scales are adapted to be moved downwardly, as hereinafter described, in proportion to logarithm of the total number of bets made.

Figure 9:
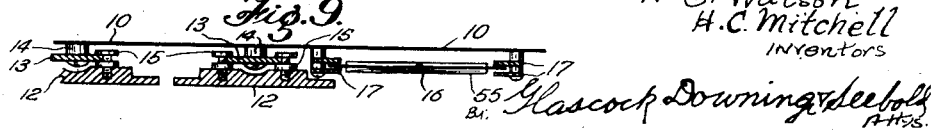
Figure 9 is a view in sectional plan taken on the line 9—9 of Figure 1 and is drawn to a larger scale.

The edges of each of the scales 16 are received in corresponding vertical guide tracks each of which is formed by a pair of spaced metal strips 17 which are secured to and spaced from the face plate 10 as also shown in Figure 9.

Preferably the indicator plates are reduced in thickness near their vertical edges whereby the plates disposed next to the scales 16 may extend in front of the guides 17 therefor.

The front faces of the scales 16, which are moved in unison, as hereinafter described, are suitably marked to display a range of odds and the odds relating to any particular horse at any stage of the investments is ascertained by reading the scale in horizontal alignment with the arrowheads disposed centrally on the indicator plate 12 corresponding to that horse.

Thus in Figure 1 the odds for No. 1 horse are 10 to 1 against, whilst the odds for No. 3 horse are 2 to 1 on, (which is equivalent to ½ to 1 against) and so on.

It will be clear that the graduations on the various odds scales 16 are identical and that it is only for convenience in reading that a plurality of such scales is provided.

The upper end of the face plate 10 of the apparatus is obscured by a board 18 mounted horizontally on the building 10', and, before any investments are recorded, the number plates 12 and the lower ends of the scales 16 are disposed behind and are obscured by this board. Indicator plate 12 for No. 2 horse is shown in this position in Figure 1—i. e., it has been assumed that no investments have been made on that horse.

Figure 2:
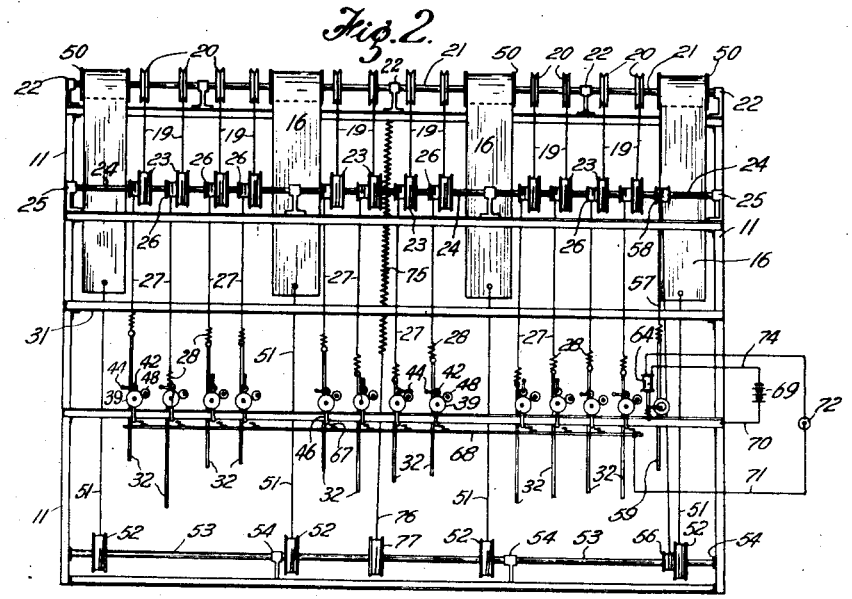
Figure 2 is a view in rear elevation of the totalizator shown in Figure 1.

Each of the indicator plates 12 is supported on the lower end of a corresponding flexible cable 19 which extends upwards in advance of the face plate 10 to and around a guide pulley 20 freely mounted on a horizontal spindle 21 supported by bearings 22 secured to the upper end of the frame 11 (see Figures 2 and 3).

The cables 19 then pass downwards from the respective pulleys 20 and are wrapped around and secured to individual pulleys 23 which are freely mounted on a further spindle 24 mounted in bearings 25 fitted to the frame.

Each of these pulleys 23 has a smaller pulley 26 rigidly secured to one side thereof, and a cable 27 having one of its ends secured thereto is wrapped therearound and then extends downwards and has its opposite end connected to a tension spring 28 the opposite end of which is fixed to a horizontal extension 29 of a vertical guide rod 30.

The upper end of each of the guide rods 30 extends through an opening in the horizontal flange of an angle shaped bar 31 which is secured to the frame 11 in any convenient manner while the lower end of each of said guide rods is secured as by welding to the upper end of a vertically movable cam 32 formed from a relatively thin metal plate.

Each of these cams 32, which may be termed "horse cams", has its front edge arranged vertically and its rear edge arranged in the form of a logarithmic curve (see Figures 3 and 5).

The weight of each indicator plate 12 is sufficient to impart an upward pull on the corresponding cam 32.

A circular cam follower 33 formed integrally with a slide 34 bears against the curved face of each cam 32 and is adapted to be moved horizontally away from the cam and through a predetermined distance for each bet made on the horse corresponding thereto.

For this purpose the slide 34 is mounted on an individual horizontal guide bar 35 of square shape in cross section and having one end secured to a horizontal bar 36 extending at right angles thereto and suitably supported on the frame 11.

The front vertical edge of each cam bears against an abutment or stop member 82 preferably formed eccentrically on a screw 83 secured to the respective guide bar 35 whereby it may be readily adjusted to firmly engage the cam when the latter is in its correct vertical position. In this way a fine adjustment is provided for the correct setting of the cam and any wear may be readily taken up (Figures 5 and 7).

The ends of the guide bars 35 remote from the bar 36 are secured in corresponding brackets 37 which are secured to a horizontally disposed angle shaped bar 38 also forming part of the frame 11.

Each of the brackets 37 rotatively supports one end of a threaded spindle 39 which is disposed parallel to the corresponding guide bar and is received in a correspondingly threaded lug 40 formed integrally with the cam follower 33 and slide 34.

A gear wheel 41 secured to the rear end of each threaded spindle 39 meshes with a pinion 42 fitted to a spindle 43 mounted in a bearing in the respective bracket 37 and fitted with a hand crank 44. A cam 45 of square formation is secured to each of the spindles 43 and is adapted to bear against one end of a corresponding lever 46 pivoted on the respective threaded spindle 39 and fitted with a tension spring 47 by which it is maintained in engagement with the cam.

A further pinion 48 meshes with each gear wheel 41 and operates a suitable form of counting device 49 which is supported on the respective bracket 37.

Each crank 44 is adapted to be manually turned through one quarter of a revolution for each investment it is desired to record in connection with the corresponding horse, and the coacting square cam 45 and lever 46 act as a convenient form of stop as well as serving to operate a switch as hereinafter described. Each investment so recorded is indicated on the corresponding counting device 49.

While the mechanism illustrated in the drawings is adapted for actuation by means of hand cranks, any other suitable means may be employed for imparting movement to the threaded spindles 39.

From the foregoing description it will be understood that the partial rotation imparted to the threaded spindles 39 when each investment is made on the horses corresponding thereto, causes the respective cam followers 33 to move a predetermined distance away from the curved face of the respective cam 32. The cam is thus free to move upwards under the influence of the weight of the respective indicator plate 12 and through a distance depending on the curvature of the cams. This curvature is such that the upward displacement of each cam 32 at any stage is proportional to the logarithm of the number of investments which have been recorded on that horse.

In other words the cam contour is set out by plotting the investments on a logarithmic scale along the vertical axis the curve so obtained being corrected to compensate for variations in the point of contact between the cam and the follower; for convenience of description logarithmic graduations are shown along one edge of the cam indicated in Figure 5 though it will be understood that in the actual apparatus these divisions need not be marked.

It will likewise be clear that the downward displacement of each number plate 12 is a multiple of the upward displacement of the respective cam 32 and is determined by the relative sizes of the pulleys 23 and 26. Consequently the position of each of the indicator plates 12 at any time is a measure of the logarithm of the number of investments recorded in favor of the horse designated thereby.

As the upper portion of the curved face of each cam is disposed at only a very small angle to the vertical, it is desirable to provide auxiliary means for locating the cams in the requisite positions corresponding to the first three investments. Furthermore, as shown at 78 in Figure 5, the cam may be stepped in the requisite positions for the fourth to the tenth investments in order to more positively determine the position of the cam at that stage.

The auxiliary locating means above referred to comprise three notches 79 formed in an upper portion of the respective guide rod 30 and adapted to be engaged by a flat spring 80 secured at one end to the angle bar 31. A further notch 81 corresponding to the zero position of the cam is arranged above the notches 79 and is engaged by the spring 80 until the first investment is made on the corresponding horse. The spring 80 is then pushed inwards to disengage the notch 81 and allow the cam 32 to move upwards until its motion is arrested by the engagement of spring 80 with the upper notch 79. This procedure is repeated for the following two investments after which the motion of the cam is controlled by the follower 33 in the manner previously described.

It has previously been explained that the odds scales 16, which are arranged adjacent to the indicator plates 12, are formed of flexible strips of sheet metal. These flexible strips extend upwardly to and pass over guide rollers 50 (see Figures 2 and 4) freely mounted on spindle 21 and their rearward ends are connected by cables 51 to pulleys 52 corresponding in diameter to the pulleys 23 and secured to a spindle 53 rotatively mounted in bearings 54 near the lower end of the machine. The cables 51 pass several times around the pulleys 52 and have their corresponding ends secured thereto.

As the pulleys 52 are all secured to a common spindle it follows that the various scales 16 always occupy corresponding positions. The lower ends of the scales 16 at the front of the apparatus are preferably loaded as by metal plates 55 whereby tension is imparted to the corresponding cables 51.

A small pulley 56 corresponding in diameter to the pulleys 26 is secured to spindle 53 adjacent to one end thereof (see right-hand portion of Figure 2 and Figure 4) and a cable 57, which passes several times around and is secured at one end to the pulley 56, extends upwardly over a guide pulley 58 which is freely mounted on the spindle 24. The cable then passes downwards and is secured to a cam 59 in the manner previously described with reference to the horse cams 32.

This cam 59, which may be termed the "total investments cam", is identical with the horse cams 32 and is engaged by a similar follower 33 which in turn is actuated by corresponding mechanism including a screwed spindle 39.

This threaded spindle 39 is fitted with a gear wheel 41 which meshes with a pinion 48 for a counter 49 which indicates the total number of investments, but, in lieu of a pinion as 42 and operating crank 44 as employed in connection with each of the cams 32, a ratchet wheel 60 is secured to the end of the screwed spindle (see Figure 8).

The ratchet wheel 60 is engaged by a spring pressed pawl 61 which is pivoted on a lever 62 which in turn is pivoted to the threaded spindle and the outer end of this lever is connected by a link 63 to the lower end of the reciprocable plunger of a solenoid 64 suitably supported on the frame of the machine.

A spring 65 serves to normally retain the solenoid plunger in its lowermost position in which an extension on the link 63 bears against a buffer spring 66 in the form of a flexible metal strip secured to the supporting bar 38.

The number of teeth on the ratchet wheel 60 corresponds to the number of investments recorded when one complete revolution is imparted to any of the threaded spindles 39 associated with the horse cams 32 so that each energization of the solenoid 64 causes the follower of cam 59 to be moved through the same distance as that moved through by the follower of any of cams 32 when an investment is registered by the control mechanism for said cam.

Consequently, a switch is associated with each of said control mechanisms whereby the solenoid is energized once for each investment recorded on the corresponding horse.

These switches embody flexible members 67 which are mounted on a longitudinally extending conducting strip 68 supported by and insulated from the bar 38 and these flexible members 67 are so arranged as to be engaged by a downward extension on the corresponding pivoted lever 46 when same is angularly displaced during the registration of an investment on the corresponding horse.

The circuit of the solenoid is thus completed from a battery diagrammatically indicated at 69 through conductor 70 to the frame of the machine through the appropriate pivoted lever 46 and flexible member 67, conducting strip 68, conductor 71, switch 72, conductor 73, solenoid 64 and conductor 74 back to the battery.

As the various switching means are arranged in parallel it will be clear that provided no simultaneous actuations for two or more investments occur the solenoid is energized once for every investment recorded on any of the horses and that, therefore, the downward movement of the scales 16 at the front of the machine is proportional to the logarithm of the total number of investments recorded on all the horses.

In order to counterbalance portion of the weights of the scales 16 when same are extended to a substantial extent—i. e., when a relatively large number of investments have been registered on the machine—a compensating spring 75 is provided (see Figure 2).

This spring is secured at one end to an upper portion of the frame 11 whilst its lower end is connected to a cable 76 which passes to and around a pulley 77 secured to the spindle 53 at the lower end of the machine. This cable 76 may be slack when the scales are in their uppermost positions but is progressively extended as the scales are lowered, thus counteracting portion of the weight of the scales. It will be understood, however, that sufficient excess weight is required to raise the total investments cam 59.

From the foregoing description it will be evident that the positions of the various odds as shown on the scales 16 may be determined by calculating the odds actually payable for various ratios between the total number of investments lodged and the number of investments lodged on any particular horse.

In this connection, it is clear that the vertical distance between the arrows on any of the indicating plates 12 and the lower ends of the scales 16 is a measure of the logarithm of this ratio and that, therefore, the positions of the various odds may be readily ascertained.

The odds so determined are obviously less for place investments than for win investments as, in the former case, the proportion of the total investment which is returned in the form of dividends is divided equally among the placed horses and these portions are subdivided among the backers of such horses.

Consequently for place investments it is necessary for the scales 16 to be higher relatively to the respective cam 59 than is the case with win investments.

As separate win and place machines are usually employed, it is not generally necessary to provide means for adjusting the position of the scales 16 for this purpose.

However, in a place investments machine, it is desirable to have means for correctly indicating the odds when dividends are payable on either two or three horses so that means are provided for raising the scales 16 relatively to the cam 59 when changing from two place dividends to three place dividends and vice versa.

One convenient arrangement for this purpose is shown in Figure 10 of the drawings in which the guide pulley 58 for the cable 57 extending between pulley 56 and total investments cam 59 is provided with an eccentric bush 78 which may be angularly displaced by means of a hand lever 79. The hand lever moves over a quadrant 80 having notches corresponding to the positions for two and three place dividends.

We claim:

1. In a totalizator, a vertically movable indicating member, a rectilinearly movable cam consisting of a metal plate having one of its longitudinal edges of straight formation and its opposite edge in the form of a logarithmic curve, a follower engaging the curved face of the cam, mechanism for adjusting the position of the follower and operable in accordance with the number of investments, means connecting the cam and said indicating member whereby same move in unison, and means for displacing the cam to correspond with movements imparted to the cam follower.

2. In a totalizator according to claim 1, a slide supporting the follower, a guide bar disposed at right angles to the straight longitudinal edge of the cam and having said slide mounted thereon, a nut connected with the said follower and slide, a rotatively mounted threaded spindle engaging said nut, and means for imparting rotation to the threaded spindle whereby the follower is displaced in proportion to the said number of investments.

3. In a totalizator according to claim 1, a slide supporting the follower, a guide bar disposed at right angles to the straight longitudinal edge of the cam and having said slide mounted thereon, a nut connected with the said follower and slide, a rotatively mounted threaded spindle engaging said nut, toothed gearing and a hand crank for imparting movement to the threaded spindle.

4. In a totalizator according to claim 1, a slide supporting the follower, a guide bar disposed at right angles to the straight longitudinal edge of the cam and having said slide mounted thereon, a nut connected with the said follower and slide, a rotatively mounted threaded spindle engaging said nut, a ratchet wheel on the threaded spindle, a pawl coacting with the ratchet wheel to impart rotation thereto and electromagnetic means for actuating said pawl in accordance with said number of investments.

5. In a totalizator according to claim 1, a guide rod secured to the said cam and extending parallel to the straight longitudinal edge thereof, bearings for said guide rods, notches in the guide rods corresponding to predetermined positions of the cam and a catch adapted for engagement with said notches.

6. In a totalizator according to claim 1, a plurality of steps at one end of the curved edge of the cam to ensure said cam being accurately located with respect to the follower therefor.

7. In a totalizator, an indicating member arranged for vertical movement, a logarithmic cam corresponding to said indicating member, means connecting said cam and said indicating member whereby same move in unison, means biasing said cam and indicating member towards positions corresponding to the maximum number of investments, control mechanism operable in accordance with the number of investments on a contestant corresponding with said cam whereby said biasing means becomes operative to displace the cam and said indicating member through a distance proportional to the logarithm of said numbers of investments, an odds scale movable vertically adjacent to the indicating member, a logarithmic cam connected with the said scale, and means operable in accordance with the grand total number of investments to effect movement of the last mentioned cam in such manner that the said scale is displaced through a distance proportional to the logarithm of said grand total.

8. In a totalizator according to claim 7, means biasing the last mentioned logarithmic cam towards the position corresponding to the maximum number of investments characterized in that said means operable in accordance with the grand total of investments comprises a follower engaging said cam and movable in direct proportion to the grand total of investments to permit said biasing means to become effective to displace the said cam and the odds scale connected thereto.

9. In a totalizator, a face plate or the like, an indicating member arranged for vertical movement in front of said face plate and having its zero position adjacent the upper end thereof, a control member corresponding to said indicating member, means for displacing said control member in direct proportion to the number of investments on the contestant corresponding thereto, a weight actuated logarithmic cam, means connecting said cam and said indicating member whereby same move in unison, the movement of said control member permitting movement of said cam under the influence of the controlling weight, whereby the indicating member moves downwards in proportion to the logarithm of the number of investments on the corresponding contestant, an odds scale arranged for vertical movement in front of the face plate and having its zero position adjacent the upper end of said face plate and means for moving said scale in logarithmic proportion to the grand total of investments.

10. In a totalizator, a supporting member, an odds scale formed of a flexible strip of material, said odds scale being mounted on said supporting member and having its ends depending from opposite sides thereof, means for displacing said strip in proportion to the logarithm of the grand total of investments, an indicating member arranged adjacent to the flexible strip, and means for moving said indicating member in proportion to the logarithm of the number of investments on the contestant corresponding thereto.

11. In a totalizator, an indicating member arranged for vertical movement, a flexible member supporting the indicating member, a logarithmic cam arranged for rectilinear movement, means biasing said cam for movement in one direction, control mechanism adapted to be actuated in accordance with the number of investments on a contestant corresponding to the cam to permit of said cam being displaced under the influence of the biasing means through a distance proportional to the logarithm of said number of investments, and means connecting the cam with the flexible connection passing from the indicating member whereby the latter moves in unison with the cam.

12. In a totalizator, a flexible strip of material having a scale of odds marked on one face thereof, a roller, said strip passing over the roller and extending downwards on opposite sides thereof, one of the depending portions being exposable to display the odds thereon, a rectilinearly movable logarithmic cam, a follower engaging said cam, means for displacing said follower in proportion to the total number of investments on all the contestants, means biasing the cam for movement in one direction and becoming operative upon displacement of the follower to move said cam through a distance proportional to the logarithm of said total number of investments, and means connecting said cam with the metal strip whereby same move in unison, said exposable portion of the strip being arranged to move vertically downwards as the number of investments increases.

13. In a totalizator, a vertical face plate, an indicating member corresponding to a particular contestant and arranged for vertical movement in front of the face plate, a corresponding vertically movable logarithmic cam, means embodying a flexible member for connecting the indicating member and said cam whereby same move in unison but in opposite directions, said indicating member being weighted whereby same tends to move downwards and to cause said logarithmic cam to move upwards, a follower engaging said cam, means for displacing said follower in accordance with the number of investments on the contestant corresponding thereto whereby the coacting cam will be moved upwards through a corresponding distance, a weighted odds scale adapted for vertical movement in front of the face plate, a further vertically movable logarithmic cam, means embodying a flexible member for connecting said odds scale and said further cam whereby same move in unison but in opposite directions, a follower engaging said further cam, and means for displacing said last mentioned follower in accordance with the grand total of investments to permit a corresponding downward movement of said weighted odds scale.

14. In a totalizator according to claim 13, a guide pulley for the flexible member passing from said further logarithmic cam, an eccentric bush supporting the guide pulley and means for angularly adjusting the eccentric bush to adjust the position of the odds scale relatively to said cam.

15. In a totalizator, a plurality of movable indicating members arranged adjacent to each other, a logarithmic cam corresponding to each of said indicating members, means connecting said cams and the corresponding indicating members whereby same are movable in unison, means biasing said cams and indicating members towards positions corresponding to the maximum number of investments, a control mechanism individual to each logarithmic cam and operable in accordance with the number of investments made on a contestant corresponding thereto whereby the corresponding biasing means becomes effective to displace the cam and coacting indicating member through a distance proportional to the logarithm of said number of investments, a movable odds scale arranged adjacent to said indicating members, a further logarithmic cam connected with said odds scale and movable in unison therewith, means biasing said odds scale and said further logarithmic cam towards positions corresponding to the maximum number of investments, means coacting with said further logarithmic cam, said means being displaceable to permit said biasing means to become effective to displace said odds scale and said further logarithmic cam and means operable by each said individual control mechanism to displace said means coacting with the further logarithmic cam, the resultant movement of the odds scale being proportional to the grand total of investments.

16. In a totalizator, a plurality of weighted indicating members corresponding with different contestants and arranged for vertical movement, a rectilinearly movable logarithmic cam individual to each indicating member, supporting means, a flexible connection extending upwardly from each indicating member around said supporting means and downwardly on the opposite side thereof, means connecting the downwardly extending portion of each flexible connection and the corresponding logarithmic cam whereby said indicating members and coacting cams are movable in unison, a follower engaging each of said cams, means for displacing each said follower in correspondence with the number of investments on the contestant corresponding thereto whereby said cam and the coacting indicating member will move through a corresponding distance under the influence of the weight of said indicating member, further supporting means, a flexible strip of material bearing a scale of odds and passing over said further supporting means whereby it depends from opposite sides thereof, a weight on one depending portion of said flexible strip, a further rectilinearly movable logarithmic cam, means connecting said last mentioned cam and the depending portion of the flexible strip not provided with said weight whereby said cam and said flexible strip are movable in unison, a follower engaging said last mentioned cam, electromagnetic means operable to impart movement to said last mentioned follower, and a control switch individual to each of said means for displacing said first mentioned followers, each said control switch being arranged in circuit with said electromagnetic means.

HENRY GEORGE WATSON.
HENRY CROCKETT MITCHELL.